US012752321B2

(12) United States Patent
Nakaishi et al.

(10) Patent No.: US 12,752,321 B2
(45) Date of Patent: *Oct. 6, 2026

(54) MOLDING MATERIAL, MOLDED ARTICLE, AND PRODUCTION METHOD FOR MOLDING MATERIAL

(71) Applicant: GLENCAL TECHNOLOGY CO., LTD., Tokyo (JP)

(72) Inventors: Masahito Nakaishi, Tokyo (JP); Yoshimi Yakuo, Wakayama (JP)

(73) Assignee: GLENCAL TECHNOLOGY CO., LTD., Tokyo (JP)

( * ) Notice: Subject to any disclaimer, the term of this patent is extended or adjusted under 35 U.S.C. 154(b) by 692 days.

This patent is subject to a terminal disclaimer.

(21) Appl. No.: 17/927,684

(22) PCT Filed: Jun. 18, 2021

(86) PCT No.: PCT/JP2021/023266

§ 371 (c)(1), (2) Date: Nov. 23, 2022

(87) PCT Pub. No.: WO2021/256568

PCT Pub. Date: Dec. 23, 2021

(65) Prior Publication Data

US 2023/0173562 A1 Jun. 8, 2023

(30) Foreign Application Priority Data

Jun. 19, 2020 (JP) ................................ 2020-106284

(51) Int. Cl.

| | |
|---|---|
| ***B09B 3/40*** | (2022.01) |
| ***B09B 3/20*** | (2022.01) |
| ***B09B 3/38*** | (2022.01) |
| ***B09B 101/70*** | (2022.01) |
| ***B29B 7/48*** | (2006.01) |
| ***B29B 7/72*** | (2006.01) |
| ***B29B 7/82*** | (2006.01) |
| ***B29B 7/92*** | (2006.01) |
| ***B29B 9/12*** | (2006.01) |
| ***B29C 45/00*** | (2006.01) |
| ***B29C 48/00*** | (2019.01) |
| ***C08L 101/00*** | (2006.01) |

(52) U.S. Cl.

CPC .................. *B09B 3/40* (2022.01); *B09B 3/20* (2022.01); *B09B 3/38* (2022.01); *B29B 7/48* (2013.01); *B29B 7/726* (2013.01); *B29B 7/826* (2013.01); *B29B 7/92* (2013.01); *B29B 9/12* (2013.01); *B29C 45/0001* (2013.01); *B29C 48/022* (2019.02); *C08L 101/00* (2013.01); *B09B 2101/70* (2022.01)

(58) Field of Classification Search

None

See application file for complete search history.

(56) References Cited

FOREIGN PATENT DOCUMENTS

| | | | |
|---|---|---|---|
| JP | 07-136629 | * | 5/1995 |
| JP | H07-136629 | A | 5/1995 |
| JP | 2001-246283 | A | 9/2001 |
| JP | 2004-033874 | A | 2/2004 |
| JP | 2005-118743 | A | 5/2005 |
| JP | 2009-227777 | A | 10/2009 |
| JP | 2014-025053 | * | 2/2014 |
| WO | 2010-136683 | A1 | 6/2010 |
| WO | WO 2013/076960 | * | 5/2013 |

OTHER PUBLICATIONS

International Search Report dated Aug. 10, 2021, in International Application No. PCT/JP2021/023266.

Extended European Search Report dated Dec. 20, 2023 in corresponding European Patent Application No. 21826510.6.

Reasons for Refusal drafted Dec. 24, 2021 in parent Japanese Patent Application No. 2020-106284.

* cited by examiner

*Primary Examiner* — Katarzyna I Kolb

(74) *Attorney, Agent, or Firm* — Wentsler LLC

(57) ABSTRACT

Provided is a molding material for a material of a molded article including: a biomass material obtained from a water-containing organic matter; and a thermoplastic or a thermosetting resin, the biomass material having a moisture content of 20% or less, a bacterial count of mesophilic aerobic bacteria of $10^5$/g or less, and a maximum exothermic peak by a differential thermal analysis method of 300° C. or higher.

20 Claims, 5 Drawing Sheets

MOLDING MATERIAL, MOLDED ARTICLE, AND PRODUCTION METHOD FOR MOLDING MATERIAL

TECHNICAL FIELD

The present invention relates to a molding material, a molded article, and a method for manufacturing a molding material.

BACKGROUND ART

In the related art, water-containing organic matters such as food waste have been processed through a decomposition using aerobic bacteria. General food waste processing apparatus employs a method of storing culture base material such as sawdust, rice husks, and so forth in a processing tank equipped with blades and a ventilation system and stirring the food waste crushed by a crusher together in the tank.

It has also been proposed that ozone is used for sterilizing and decomposing bacteria and molecules as an origin of bad odor that are to be exhausted into the atmosphere and converting such bacteria and molecules into harmless molecules before releasing to an atmosphere (for example, see PTL 1). Instead of simply discarding the biomass materials obtained from water-containing organic matters in such a way, reuse of the biomass materials as materials of molded articles such as trays and planters has been recently considered.

CITATION LIST

Patent Literature

PTL 1: JP-A-7-136629
PTL 2: JP-A-2010-136683

SUMMARY OF THE INVENTION

Technical Problem

However, general biomass materials obtained from water-containing organic matters have low heat resistance, and starts to carbonize at about 180° C. to 260° C. (see PTL 2). Therefore, if a molding material of the related art containing a biomass material having low heat resistance is subjected to molding such as injection molding or extrusion molding in which the molding material is to be heated at a high temperature of 180° C. to higher than 260° C., the physical property of the biomass material deteriorates, so that there is a problem that such a molding material is difficult to mold at a high temperature.

The present invention has been made in view of the above points, and an object of the present invention is to provide a molding material that includes a biomass material and can be heated during molding at a higher temperature than molding materials of the related art, a molded article, and a method for manufacturing a molding material.

Solution to Problem

The molding material according to the present invention is a molding material for a material of a molded article, and includes a biomass material obtained from a water-containing organic matter and includes at least one of a thermoplastic resin, a thermosetting resin, or an additive for a resin, and the biomass material has a moisture content of 20% or less, a bacterial count of mesophilic aerobic bacteria of $10^5$/g or less, and a maximum exothermic peak by a differential thermal analysis method of 300° C. or higher.

The method for manufacturing a molding material according to the present invention is a method for manufacturing a molding material for a material of a molded article, and the method includes a storing step of storing a water-containing organic matter in a processing tank, a processing step of heating the water-containing organic matter in the processing tank while the water-containing organic matter is stirred, supplying an ion gas having an ion density of 2,000,000 pcs/cc or higher to the processing tank at a rate ranging from 1 $m^3$/min to 300 $m^3$/min by exhausting a gas from the processing tank at a rate ranging from 1 $m^3$/min to 300 $m^3$/min to separate water molecules in the water-containing organic matter and evaporate water contained in the water-containing organic matter, for manufacture of a k and a manufacturing step of mixing at least one of a thermoplastic resin, a thermosetting resin, or an additive for a resin with the biomass material to manufacture a molding material.

Advantageous Effects of the Invention

According to the present invention, a biomass material is used that has a temperature of a maximum exothermic peak detected by the differential thermal analysis method higher than that of biomass materials of the related art, and therefore heating during molding can be performed at a higher temperature than in the related art.

DESCRIPTION OF EMBODIMENTS

Figure 1:
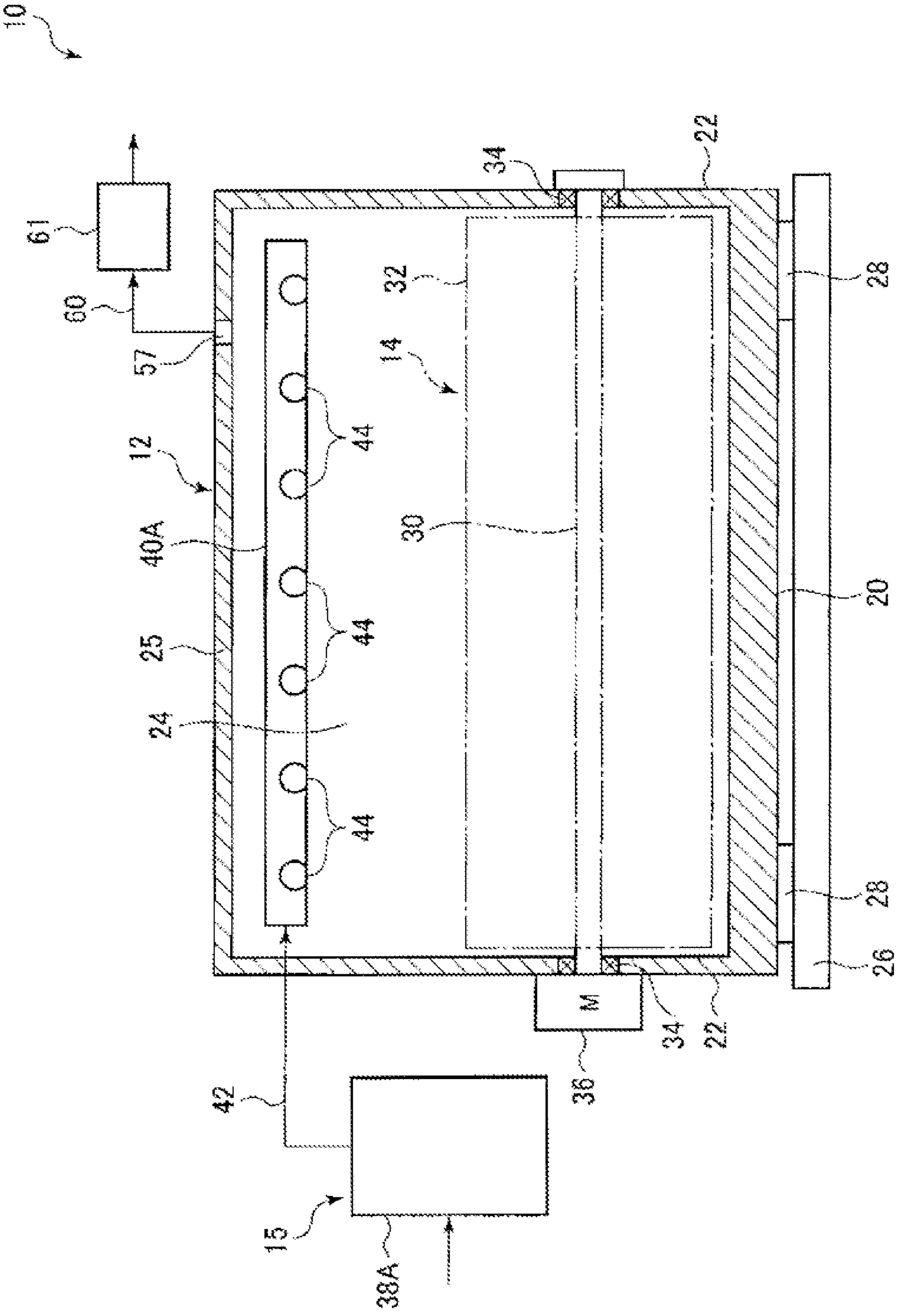
FIG. 1 A cross-sectional view illustrating a sectional configuration of a processing apparatus used for manufacturing a biomass material according to an embodiment when the processing apparatus is viewed from a side.

Referring to the drawings, an embodiment of the present invention will be described below in detail.

(1)<Biomass Material According to Present Embodiment>

The biomass material according to the present embodiment is manufactured by heating a water-containing organic matter in a processing tank while the water-containing organic matter is stirred, and at the same time, exhausting a gas from the processing tank at a rate ranging from 1 $m^3$/min to 300 $m^3$/min, and supplying an ion gas having an ion density of 2,000,000 pcs/cc or higher to the processing tank.

Examples of the water-containing organic matter that serves as a raw material of the biomass material include vegetable waste, fruit waste, cut grass, organic residues after beverage extraction, meat waste, waste of fish such as salmon, sewage, and waste foods. Examples of the organic residues after beverage extraction include apple lees, tangerine lees, grape lees, grapefruit lees, peach lees, carrot lees, green pepper lees, liquor lees, used green tea leaves, barley tea residues, and coffee grounds.

In manufacturing a biomass material from these water-containing organic matters, the processing time may slightly depend on the kind of the water-containing organic matter, and therefore a plurality of kinds of water-containing organic matters are preferably processed separately without being mixed together to manufacture a biomass material.

The biomass material according to the present embodiment can be included in a molding material that serves as a material of a molded article in manufacturing various molded articles including, for example, various trays such as service trays, desk trays, pen trays, and coaster trays, containers such as containers and planters, parts of electronic equipment, parts of automobiles, blocks, and building materials.

The biomass material manufactured by the above-described processing of the water-containing organic matter has a moisture content of 20% or less and a bacterial count of mesophilic aerobic bacteria of $10^5$/g or less. In addition to such a configuration, the biomass material according to the present embodiment has a maximum exothermic peak detected at 300° C. or higher by the differential thermal analysis method when heated from room temperature in the atmosphere, and therefore has high heat resistance and is less likely to carbonize even when heated at a high temperature.

The moisture content of the biomass material according to the present embodiment can be measured with a loss on drying method. The loss on drying method includes measuring the weight of the water-containing organic matter before processing containing water, heating the water-containing organic matter to evaporate water, then measuring the weight of the water-containing organic matter with zero moisture, thereby assuming the reduced weight to be moisture to measure the moisture content.

The bacterial count of mesophilic aerobic bacteria can be measured, for example, with a standard agar plate culture method. In the present embodiment, the bacterial count of mesophilic aerobic bacteria is determined in accordance with the standard agar plate culture method performed by Japan Food Research Laboratories (https://www.jfrl.or.jp/storage/file/072.pdf).

The temperature at which the maximum exothermic peak appears in the differential thermal analysis method can be measured with a thermal analyzer (for example, a simultaneous thermogravimetric/differential thermal analyzer (product name "TG/DTA7220") manufactured by SII NanoTechnology Inc.). Specifically, while a sample (biomass material) and a reference substance (alumina in this case) are heated from room temperature in the atmosphere, the temperature difference between the sample and the reference substance is measured to obtain a curve indicating the temperature difference between the sample and the reference substance (hereinafter, also referred to as a differential thermal analysis (DTA) curve), and the obtained curve is analyzed to specify the temperature at which the maximum exothermic peak appears.

The biomass material according to the present embodiment preferably has a maximum exothermic peak detected at 300° C. or higher, preferably 350° C. or higher and 700° C. or lower, and more preferably 450° C. or higher and 600° C. or lower with the differential thermal analysis method when heated from room temperature in the atmosphere.

In the present embodiment, the temperature at which the maximum exothermic peak appears in the differential thermal analysis method has been confirmed in the biomass materials obtained by processing, for example, apple lees, carrot lees, and coffee grounds respectively. As a result, it has been confirmed that all of the biomass materials have a maximum exothermic peak detected at 400° C. or higher. This verification test will be described below.

In a biomass material manufactured with a food waste processing apparatus of the related art that processes water-containing organic matters such as food waste by, for example, simply crushing and heating without supplying the above-described ion gas (hereinafter, simply referred to as a biomass material of the related art), the temperature at which the maximum exothermic peak appears in the differential thermal analysis method is confirmed to be about 180° C. to 260° C. That is, the biomass material according to the present embodiment has a maximum exothermic peak that appears at a remarkably higher temperature than the maximum exothermic peak of biomass materials of the related art in the differential thermal analysis method, and thus the biomass material has a physical property clearly different from that of biomass materials of the related art.

In the case of manufacturing a molded article by molding such as injection molding or extrusion molding, the raw material is generally to be heated at a high temperature of 180° C. to higher than 260° C. Therefore, if a biomass material of the related art, which has low heat resistance, is used as a raw material of a molded article, the biomass material carbonizes or oxidizes by heating, resulting in deterioration of its physical property, so that it is difficult for a molding material to include such a biomass material a raw material of a molded article.

In contrast, the biomass material according to the present embodiment has a maximum exothermic peak that appears in the differential thermal analysis method at a temperature of 300° C. or higher, and thus has high heat resistance. Therefore, even if included in a molding material in the case of manufacturing a molded article by molding, the biomass material is less likely to, for example, carbonize by heating and is free of deterioration of the physical properties, and thus can be used as a raw material of a molded article.

Furthermore, it has been confirmed that even if a biomass material of the related art is set to have a moisture content of 20% or less immediately after manufacture, the moisture content increases with time and exceeds 20%. It has also been confirmed that a biomass material of the related art having a moisture content of more than 20% has a bacterial count of mesophilic aerobic bacteria of $10^8$/g or more when measured with the standard agar plate culture method. As a result, biomass materials of the related art start to decay after a lapse of a predetermined time from manufacture, and the state immediately after the manufacture cannot be maintained for one year, so that the long-term preservation of biomass materials of the related art is difficult.

In contrast, the biomass material according to the present embodiment has the above-described moisture content, bacterial count of mesophilic aerobic bacteria, and temperature at which the maximum exothermic peak is detected with the differential thermal analysis method, even when measured after being left at room temperature for one year after manufacture. For example, it has been confirmed that as a result of measuring the moisture content about one year after manufacture, the biomass materials according to the present embodiment obtained by processing coffee grounds and apple lees still have a moisture content of 20% or less and a bacterial count of mesophilic aerobic bacteria of $10^5$/g or less although the biomass materials have been left untouched at room temperature (20° C.±15° C. (5 to 35° C.)) for about one year after manufacture. Furthermore, these biomass materials have a maximum exothermic peak detected at 300° C. or higher with the differential thermal analysis method even about one year after manufacture.

Considering from such verification results, it can be inferred that the biomass material according to the present embodiment can maintain the moisture content and the like for a long time as they are at the time of manufacture because in the biomass material, unlike in biomass materials of the related art, many cell walls are not destroyed. It can also be inferred that the processing of supplying an ion gas having an ion density of 2,000,000 pcs/cc or higher to the processing tank at the time of manufacture causes various phenomena such as reduction in the size and the polarity of water clusters during the processing, reduction in the polymer size of the biomass material, formation of the porous polymer surface, sterilization of the biomass material, deodorization of the biomass material, and adjustment of the magnitude of polarity of the biomass material.

As a result, a biomass material can be provided that can maintain its moisture content, bacterial count of mesophilic aerobic bacteria, and temperature at which the maximum exothermic peak is detected with the differential thermal analysis method for a long time as they are at the time of manufacture, and has long-term preservability and high heat resistance.

(2)<Method for Manufacturing Biomass Material According to Present Embodiment>

(2-1)<Overall Configuration of Processing Apparatus Used for Manufacturing Biomass Material According to Present Embodiment>

Next, an example of a processing apparatus used for manufacturing a biomass material according to the present embodiment will be described. FIG. 1 is a cross-sectional view illustrating a sectional configuration of a processing apparatus 10 used for manufacturing the biomass material according to the present embodiment when the processing apparatus 10 is viewed from a side 24, and FIG. 2 is a cross-sectional view illustrating a sectional configuration of the processing apparatus 10 viewed from an end 22.

Figure 2:
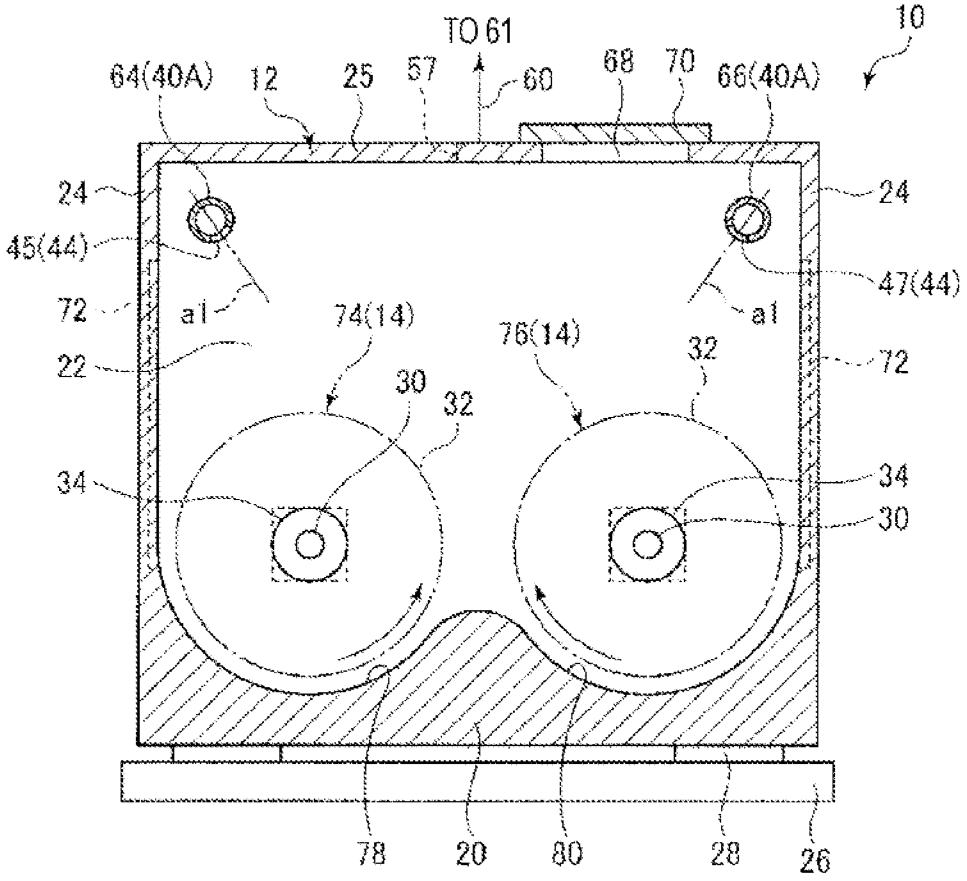
FIG. 2 A cross-sectional view illustrating a sectional configuration of the processing apparatus illustrated in FIG. 1 when the processing apparatus is viewed from an end.

As illustrated in FIG. 1 and FIG. 2, the processing apparatus 10 includes a processing tank 12, a stirring unit 14, an ion gas supply unit 15, an exhaust unit 61, and a heater 72, and is configured to process a water-containing organic matter stored in the processing tank 12. The processing tank 12 includes a bottom portion 20, a pair of ends 22 arranged opposite each other in a longitudinal direction (FIG. 1) and a pair of sides 24 arranged opposite each other in a short-side direction (FIG. 2), and an upper portion 25 to form a sealed space inside. The processing tank 12 may be formed, for example, of fiber-reinforced plastics (FRP), but not limited thereto. The bottom portion 20 of the processing tank 12 is provided with a base 26 via a load cell 28.

The processing tank 12 in the present embodiment is set to have the sealed space having a length of approximately 4.5 m in the longitudinal direction in which the pair of ends 22 oppose each other, a width of approximately 2.3 m in the short-side direction in which the pair of sides 24 oppose each other, and a height of approximately 1.6 m from the upper portion 25 to the lowest points of curved surfaces 78, 80 of the bottom portion 20.

The load cell 28 measures a load applied from the processing tank 12 installed on the load cell 28, and upon reception of a reset command from an operation panel (not illustrated), sets the measured value at the time of reception of the reset command as a reference value. Accordingly, the load cell 28 receives a reset command immediately after a water-containing organic matter is put in the processing tank 12, and then is able to set the weight of the water-containing organic matter before processing as a reference value and can measure a tendency of weight loss of the water-containing organic matter during the processing and the weight of the water-containing organic matter after completion of the processing (biomass material) using the reference value.

The upper portion 25 includes an inlet opening 68 opening at a predetermined position in a thickness direction, and a lid 70 configured to open and close the inlet opening 68. The lid 70 is rotatably fixed to the upper portion 25 via a hinge at one end thereof to open and close the inlet opening 68. Accordingly, the water-containing organic matter is loaded into the processing tank 12 through the inlet opening 68 exposed with the lid 70 opened and is stored in the sealed processing tank 12 with the lid 70 closed.

As illustrated in FIG. 2, the sides 24 are respectively provided with the heaters 72, such as hot wire heaters or PTC heaters. The heaters 72 heat the interior of the processing tank 12 to shift the temperature in the processing tank 12 in a range from 25° C. to 70° C. The temperature in the processing tank 12 is a value measured by a thermometer installed in the sealed space in the processing tank 12 in which the water-containing organic matter is stored.

In this manner, the phenomenon that the temperature in the processing tank 12 shifts within the range from 25° C. to 70° C. is caused by the change in temperature in the processing tank 12 according to the state of processing of the water-containing organic matter. However, an average temperature in the processing tank 12 when the temperature in the processing tank 12 falls within the range from 25° C. to 70° C. preferably falls within a range from 30° C. to 50° C. The average temperature in the processing tank 12 is an average temperature obtained by measuring the temperature in the processing tank 12 by a plurality of times at predetermined intervals or at any timing when the temperature in the processing tank 12 falls within the range from 25° C. to 70° C. by being heated by the heater 72, and finally completing the processing of the water-containing organic matter.

When the water-containing organic matter is processed by a heating process with an average temperature in the processing tank 12 lower than 30° C., the water-containing organic matter can hardly be dried. Therefore, the average temperature in the processing tank 12 is preferably 30° C. or higher. If the water-containing organic matter is processed by a heating process such that the average temperature in the processing tank 12 exceeds 50° C., the water-containing organic matter may be dried excessively, and thus the biomass material tends to diffuse into the atmosphere in the form of dust at the time of completion of the processing. Therefore, the average temperature in the processing tank 12 is preferably 50° C. or lower.

The stirring unit 14 provided in the processing tank 12 includes, as illustrated in FIG. 2, a first stirring unit 74 arranged on one side and a second stirring unit 76 arranged on the other side of the processing tank 12 in the short-side direction. The first stirring unit 74 and the second stirring unit 76 have the same configuration and each include, as illustrated in FIG. 1, a rotating shaft 30 disposed between the ends 22, and a blade 32 provided on the rotating shaft 30. The rotating shaft 30 is supported by bearings 34 provided respectively at the ends 22 in a rotatable manner with respect to the processing tank 12. One end of the rotating shaft 30 is connected to a drive unit 36.

In the case of the present embodiment, the first stirring unit 74 rotating counterclockwise and the second stirring unit 76 rotating clockwise stir the water-containing organic matter stored in the processing tank 12 to guide from the bottom portion 20 side of the processing tank 12 toward between the first stirring unit 74 and the second stirring unit 76.

The bottom portion 20 includes arcuate curved surfaces 78, 80 along the first stirring unit 74 and the second stirring unit 76. The curved surfaces 78, 80 are formed along trajectories of circular rotations of the respective blades 32 of the first stirring unit 74 and the second stirring unit 76 that rotate about the rotating shaft 30.

In addition to the above configuration, the upper portion 25 of the processing tank 12 in the present embodiment is provided at a predetermined position with an exhaust port 57 penetrating therethrough in the thickness direction. The exhaust unit 61 is connected to the exhaust port 57 via a flow channel 60. The exhaust unit 61 is, for example, a blower and is configured to suck a gas in the processing tank 12 and exhausts the gas in the processing tank 12 to outside during the processing of the water-containing organic matter in the processing tank 12.

In the present embodiment, the exhaust unit 61 preferably exhausts the gas from the processing tank 12 at a rate ranging from 1 $m^3$/min to 300 $m^3$/min, more preferably from 50 $m^3$/min to 300 $m^3$/min. The amount of gas exhausted from the processing tank 12 corresponds to the amount of gas exhausted from the exhaust unit 61, which exhausts the gas in the processing tank 12 to the atmosphere, and may be adjusted to a desired amount of exhaustion by adjusting a set value of the blower assuming that the blower is employed as the exhaust unit 61.

The processing tank 12 receives a supply of an ion gas (here, a negative-ion-containing gas (for example, negative-ion-containing air)) from the ion gas supply unit 15 described below by an amount corresponding to the amount of the gas exhausted from the processing tank 12. In this case, exhausting the gas from the processing tank 12 at a rate of 1 $m^3$/min or higher may allow for maintenance of the amount of supply of the ion gas from the ion gas supply unit 15 described below to the processing tank 12 at an optimal value, and may also allow for appropriate circulation of the gas in the processing tank 12 to prevent the occurrence of condensation in the processing tank 12, resulting in acceleration of water vaporization of the water-containing organic matter. A rate of 50 $m^3$/min or higher may allow for an increase in the amount of supply of the ion gas from the ion gas supply unit 15, and also may allow for an acceleration in the circulation of the gas in the processing tank 12 to ensure an effect of prevention of occurrence of condensation and the like.

Meanwhile, exhausting the gas from the processing tank 12 at a rate of 300 $m^3$/min or lower allows for retention of the ion gas introduced from the ion gas supply unit 15 to the processing tank 12 in the processing tank 12, and prevention of the biomass material from transforming to dust due to excessive evaporation of the moisture in the water-containing organic matter caused by circulating gas in the processing tank 12.

The ion gas supply unit 15 includes a negative ion generator 38A, an upper supply tube 40A including upper nozzles 44, and a flow channel 42 by which the negative ion generator 38A and the upper supply tube 40A communicate. The ion gas supply unit 15 makes the negative ion generator 38A generate negative ions, for example, by corona discharge or thermal ionization, supplies the ion gas containing the negative ions through the flow channel 42 to the upper supply tube 40A, and discharges the ion gas from the upper nozzles 44 of the upper supply tube 40A into the processing tank 12.

In the present embodiment, the negative ion generator 38A is configured to suck the atmosphere along with the exhaustion of gas from the processing tank 12 to generate negative ions in the gas passing through the negative ion generator 38A. The negative ion generator 38A ionizes gas molecules, for example, by detaching electrons from gas molecules such as oxygen and nitrogen contained in the atmosphere.

In the present embodiment, the amount of supply of the ion gas from the ion gas supply unit 15 to the processing tank 12 is adjusted by adjusting the amount of gas exhausted from the processing tank 12 by the exhaust unit 61. In this case, the ion gas supplied from the ion gas supply unit 15 to the processing tank 12 has an ion density of 2,000,000 pcs/cc or higher, preferably 20,000,000 pcs/cc or higher, and more preferably 60,000,000 pcs/cc or higher.

The phrase, for example, "supplying an ion gas having an ion density of 2,000,000 pcs/cc or higher at a rate ranging from 1 $m^3$/min to 300 $m^3$/min" means supplying $2{,}000{,}000\times10^6=2\times10^{12}$ pcs or more ions per minute. Ions supplied in this manner reliably diffuses into the water-containing organic matter to promote separation of water molecules from the water-containing organic matter, and thus water contained in the water-containing organic matter evaporates to reduce the amount of the water-containing organic matter.

Negative ions used for the food waste processing apparatus of the related art are used for deodorizing the interior of the food waste processing apparatus and are not used from the viewpoint of directly affecting and processing the water-containing organic matters such as the food waste. Therefore, an ion gas generated in the food waste processing apparatus has an ion density about the same as the ion density generated by an ion generator used in an air purifier, and the ion density generally has order of about $10^6$ pieces/cc (Reference Literature 1: JP-A-2011-206665, Reference Literature 2: JP-A-2008-175428).

The product specification of ITC-201A, the ion counter described Literature 1 and 2, describes that the sampling air flow rate is approximately 500 cc/sec (https://www.andes.co.jp/product/prd ai/prd ai inti itc-201a/). Therefore, the amount of ions is calculated to be $5\times10^8$ pieces/sec from $10^6$ pieces/cc$\times$500 cc/sec, and when converted into the amount per minute, the amount of ions is determined to be $3\times10^9$ pieces. This value is smaller than the numerical value in the present application, $2\times10^{12}$ pcs or more per minute, by about 3 orders.

Therefore, an ion gas used in the food waste processing apparatus of the related art is as thin as being diffused in odor (gas) in the food waste processing apparatus and is not considered to be sparse enough to diffuse the negative ions also into the food waste.

In contrast, in the present embodiment, the ion density in the processing tank 12 is 2,000,000 pcs/cc or higher, preferably higher than 20,000,000 pcs/cc, and more preferably 60,000,000 pcs/cc or higher to achieve the ion density in the processing tank 12 much higher than that in the food waste processing apparatus used for deodorization of the related art, so that diffusion of the negative ions in the ion gas into the water-containing organic matter is ensured, thereby promoting separation of water molecules from the water-containing organic matter.

The water molecules separated from the water-containing organic matter ascend in the processing tank 12, and during the ascending, the cluster structure in which a plurality (for example, five or six) of the water molecules are bound together breaks, and a part of the water molecules evaporates and is discharged to the outside by the exhaust unit 61.

In contrast, the remaining water molecules, that is, the water molecules having the cluster structure maintained, stay at a boundary between the water-containing organic matter being stirred and a space in the processing tank 12 filled with gas. However, the ion gas is blown to the boundary described above, and thus the negative ions in the ion gas decompose the cluster structure of the water molecules. The water molecules having subjected to the decomposition of the cluster structure are easily evaporated by the calorific power from the heater 72 and are discharged to the outside by the exhaust unit 61.

As described above, by increasing the ion density of the ion gas to a high density, the ion gas separates the water contained in the water-containing organic matter from the water-containing organic matter, and the ion gas decomposes the cluster structure of the water molecules. Therefore, the processing apparatus 10 may reduce the weight of the water-containing organic matter easily by the evaporation of the water contained therein.

An ion density of higher than 20,000,000 pcs/cc in the processing tank 12 make it much easier to diffuse the negative ions into the water-containing organic matter, and thus the water contained in the water-containing organic matter can be separated from the water-containing organic matter by the ion gas and decomposition of the cluster structure of the water molecules can be accelerated correspondingly. An ion density of 60,000,000 pcs/cc or higher in the processing tank 12 can further ensure the diffusion of the negative ions in the water-containing organic matter.

The upper supply tube 40A that communicates with the negative ion generator 38A includes the upper nozzles 44 each made, for example, of circular opening at predetermined positions at predetermined intervals. The upper supply tube 40A is disposed parallel to the rotating shaft 30 and is provided at a position above the rotating shaft 30.

In the case of the present embodiment, the upper supply tube 40A is disposed at a position above the stored water-containing organic matter when the water-containing organic matter is stored in the processing tank 12 so as to be able to inject an ion gas from above the water-containing organic matter via the upper nozzles 44 without being buried in the stored water-containing organic matter when the water-containing organic matter is stored in the processing tank 12.

The upper supply tube 40A includes a first pipe 64 and a second pipe 66 disposed on both sides with the exhaust port 57, which is provided at a center of the processing tank 12 in the short-side direction, interposed therebetween. The first pipe 64 is disposed so as to extend along one side 24 (the side on the left in FIG. 2), and the second pipe 66 is disposed so as to extend along the other side 24 (the side on the right in FIG. 2).

The first pipe 64 includes a first upper nozzle 45 formed as one of the upper nozzles 44, and the second pipe 66 includes a second upper nozzle 47 formed as one of the upper nozzles 44. The first upper nozzle 45 and the second upper nozzle 47 preferably open in a range from a central orientation of the processing tank 12 in a horizontal direction to a downward orientation in a vertical direction.

In the present embodiment, a line al connecting between a center portion of the first pipe 64 and the first upper nozzle 45 and a line al connecting between a center portion of the second pipe 66 and the second upper nozzle 47 extend toward a portion between the first stirring unit 74 and the second stirring unit 76. Accordingly, the first pipe 64 and the second pipe 66 inject an ion gas toward a boundary between the water-containing organic matter introduced from the bottom portion 20 of the processing tank 12 toward between the first stirring unit 74 and the second stirring unit 76 and a space in the processing tank 12 filled with gas.

(2-2)<Method for Manufacturing Biomass Material Using Processing Apparatus>

Next, a method for manufacturing a biomass material from a water-containing organic matter using the processing apparatus 10 will be described. In this case, a user loads a water-containing organic matter to be processed into the processing tank 12 and stores the water-containing organic matter in a sealed space in the processing tank 12 (storing step). The user then issues a process start command via an operating panel (not illustrated) of the processing apparatus 10 to drive the stirring unit 14, the exhaust unit 61, the heater 72, and the negative ion generator 38A and starts processing of the water-containing organic matter in the processing apparatus 10.

In this case, the processing apparatus 10 drives the stirring unit 14 and stirs the water-containing organic matter in the processing tank 12 when the process start command is issued (stirring). In this case, stirring of the water-containing organic matter by the stirring unit 14 is done to the extent that the water-containing organic matter can circulate in the entire processing tank 12.

The processing apparatus 10 drives the exhaust unit 61 when the process start command is issued, starts exhausting the gas from the processing tank 12 at a rate ranging from 1 $m^3$/min to 300 $m^3$/min (exhausting) and drives the negative ion generator 38A to generate negative ions in the gas.

The negative ion generator 38A sucks the atmosphere by an amount corresponding to the amount of the gas exhausted from the processing tank 12 by the exhaust unit 61 and ionizes gas molecules by detaching electrons from gas molecules such as oxygen and nitrogen contained in the atmosphere. At this time, the amount of exhaustion by the exhaust unit 61 is adjusted, and the ion gas having an ion density of 2,000,000 pcs/cc or higher, preferably higher than 20,000,000 pcs/cc, and more preferably 60,000,000 pcs/cc or higher is supplied from the ion gas supply unit 15 into the processing tank 12, so that the processing tank 12 is filled with the ion gas (supplying ion gas).

At this time, the processing apparatus 10 drives the heater 72, heats the interior of the processing tank 12, shifts the temperature in the interior of the processing tank 12 within the range from 25° C. to 70° C., and adjusts an average temperature in the processing tank 12 at the time of completion of the processing within this temperature range to fall within a range from 30° C. to 50° C. (heating).

In this manner, the processing apparatus 10 performs stirring of the water-containing organic matter, heating the interior of the processing tank 12, exhaustion of gas from the interior of the processing tank 12, and supply of the ion gas having at least a predetermined value of ion density into the processing tank 12 continuously for a predetermined time (processing step).

Accordingly, the processing apparatus 10 stirs and heats the water-containing organic matter, circulates gas in the processing tank 12 by exhaustion, and supplies an ion gas into the processing tank 12, and by the synergistic effects these operations, makes water molecules contained in the water-containing organic matter easily separate and decompose the water-containing organic matter, and decomposes the cluster structure of water molecules, thereby efficiently decomposing the water-containing organic matter. Accordingly, the water-containing organic matter processed by the processing apparatus 10 ultimately may become a biomass material having a desired moisture content and a significantly reduced weight compared to the water-containing organic matter of the initial state.

Here, the time to terminate the processing of the water-containing organic matter is preferably determined according to the moisture content of the water-containing organic matter. More specifically, the processing of the water-containing organic matter is preferably terminated when the moisture content of the biomass material ranges from 2% to 20%, more preferably from 10% to 20%. The moisture content is a value measured with the above-described loss on drying method.

When the moisture content of the biomass material obtained by processing the water-containing organic matter is less than 2%, the biomass material is excessively dry and becomes dust, and, for example, the biomass material may be flown up into the atmosphere when the processing tank 12 is opened. Therefore, the moisture content of the biomass material is preferably 2% or more. Setting the moisture content of the biomass material to 20% or less can suppress the bacterial count of mesophilic aerobic bacteria to $10^5$/g or less, and thus the biomass material can be used as a raw material of a molded article. In a case where the biomass material is included in a molding material, the moisture content of the biomass material is preferably set to 10% or more and 20% or less from the viewpoint of ease of handling.

The processing time of such a water-containing organic matter depends on the amount of the loaded water-containing organic matter, the kind of the water-containing organic matter, the moisture state of the water-containing organic matter, the heating temperature in the processing tank 12, the amount of the supplied ion gas, the amount of the gas exhausted from the processing tank 12, and so forth. However, if the water-containing organic matter is general vegetable waste or an organic residue after beverage extraction having a moisture content ranging from 40% to 90% and a weight ranging approximately from 30 kg to 300 kg, a biomass material having a moisture content of 20% or less can be obtained by, for example, processing the water-containing organic matter by setting the ion density to 60,000,000 pcs/cc or higher continuously for a time period ranging from 2 hours to 70 hours under the above-described processing conditions.

In general, in the processing tank having a low temperature of 50° C. or lower, it is difficult to suppress the bacterial count of mesophilic aerobic bacteria in the water-containing organic matter to $10^5$/g or less. However, the processing apparatus 10 stirs the water-containing organic matter, circulates gas in the processing tank 12, and supplies an ion gas to the water-containing organic matter when processing the water-containing organic matter, so that even when the average temperature in the processing tank 12 is reduced to 50° C. or lower, the bacterial count of mesophilic aerobic bacteria in the biomass material can be reduced to $10^5$/g or less in a short time by the synergistic effects of these operations.

In addition to those described above, if the reduction of the total amount of the water-containing organic matter by processing the water-containing organic matter is intended, the processing time for the water-containing organic matter can be determined according to the results of weight measurement of the water-containing organic matter obtained by the load cell 28. The processing apparatus 10, under the above-described processing conditions, is capable of reducing the water-containing organic matter before processing in the processing tank 12 to a range from one-eighth to one-third by processing the water-containing organic matter continuously for a time period from 2 hours to 70 hours.

In this case, the processing apparatus 10 detects that the weight of the water-containing organic matter before processing in the processing tank 12 is reduced to a range from one-eighth to one-third by the load cell 28 and notifies users via sounds or lights, so that the completion of processing of the water-containing organic matter can be notified to the users.

(3)<Molding Material>

Next, a molding material including the above-described biomass material will be described. The molding material according to the present embodiment includes at least one of a thermoplastic resin, a thermosetting resin, or an additive for a resin in addition to the above-described biomass material. In this case, the molding material preferably includes at least 5 mass %, preferably 10 mass % or more, and more preferably 30 mass % or more of the biomass material. If the molding material includes at least 5 mass % of the biomass material, a molded article can be obtained that has an improved bending strength as compared with, for example, a molded article of a general-purpose polypropylene resin (PP) of the related art.

In consideration of cost reduction, the molding material preferably includes 50 mass % or more, preferably 70 mass % or more, and more preferably 95 mass % or more of the biomass material. Increasing the content of the biomass material included in the molding material can reduce the corresponding content of the thermoplastic resin, the thermosetting resin, and the additive for a resin, and thus a more amount of the biomass material can be reused. The biomass material manufactured using a water-containing organic matter that is generally discarded is inexpensive, and therefore the manufacturing cost of the molding material, such as the raw material cost, can be reduced by reducing the content of the thermoplastic resin, the thermosetting resin, and the additive for a resin and increasing the content of the biomass material.

In the molding material, the part other than the biomass material is not particularly limited, but the part preferably includes, for example, at least one of a thermoplastic resin, a thermosetting resin, or an additive for a resin. These thermoplastic resin, thermosetting resin, and additive for a resin can be used, as the part other than the biomass material, singly or in combination of two of more kinds thereof.

The thermoplastic resin is not particularly limited, and examples of the thermoplastic resin include a polypropylene resin (PP), a polyethylene resin (PE), a polyvinyl chloride resin (PVC), a polystyrene resin (PS), an acrylonitrile-butadiene-styrene resin (ABS), an acrylonitrile-styrene resin (AS), an acrylic resin (PMMA), a polybutylene terephthalate resin (PBT), and a polyethylene terephthalate resin (PET). These may be used singly or in combination of two or more kinds thereof.

The thermosetting resin is not particularly limited, and examples of the thermosetting resin include an epoxy resin, a phenol resin, a urea resin, a melamine resin, an unsaturated polyester resin, a diallyl phthalate resin, a polyurethane resin, a silicon resin, a polyimide resin, and a polyamino-amide resin. These may be used singly or in combination of two or more kinds thereof.

The additive for a resin is not particularly limited, and examples of the additive include a flame retardant, a heat stabilizer, a light stabilizer, a colorant, an antioxidant, an antistatic agent, and a lubricant. These may be used singly or in combination of two or more kinds thereof.

(4)<Method for Manufacturing Molding Material>

Next, a method for manufacturing a molding material will be described. First, a biomass material is manufactured in accordance with the above-described method for manufacturing a biomass material, and then foreign materials are removed from the biomass material by a vibration screen. The biomass material obtained by removing the foreign materials and at least one of a thermoplastic resin, a thermosetting resin, or an additive for a resin are put into a mixer and mixed to obtain a molding material.

The obtained molding material is put into, for example, a pellet mill and formed into pellets, and the pellets are dried by a dehumidification dryer. Thus, a molding material having a pellet form can be manufactured (manufacturing step).

The molding material may be used as it is in a powdery form obtained by mixing with a mixer, or may be used in a pellet form obtained with a pellet mill and a dehumidification dryer as described above.

The molding material thus obtained is formed into a predetermined shape by known molding such as injection molding or extrusion molding, and thus a molded article having a desired form can be manufactured.

(5)<Operation and Effects>

In the above-described configuration, the molding material includes, as a biomass material obtained from a water-containing organic matter, a biomass material having a moisture content of 20% or less, a bacterial count of mesophilic aerobic bacteria of $10^5$/g or less, and a maximum exothermic peak detected at 300° C. or higher with a differential thermal analysis method. As described above, the molding material includes a biomass material having a maximum exothermic peak detected with the differential thermal analysis method at a higher temperature than the maximum exothermic peak of biomass materials of the related art, and therefore can be heated during molding at a higher temperature than molding materials of the related art.

In a method for manufacturing such a biomass material, first, a water-containing organic matter stored in the processing tank 12 is stirred with the stirring unit 14, and the interior of the processing tank 12 is heated by the heater 72. At the same time, the processing apparatus 10 exhausts gas from the processing tank 12 by the exhaust unit 61 at a rate ranging from 1 $m^3$/min to 300 $m^3$/min, and along with the exhaustion, supplies an ion gas having an ion density of 2,000,000 pcs/cc or higher from the ion gas supply unit 15 to the processing tank 12 to process the water-containing organic matter (processing step).

As described above, in the processing apparatus 10, the biomass material according to the present embodiment can be manufactured, without using a culture base material of the related art, by processing a water-containing organic matter with a method including stirring the water-containing organic matter, heating the interior of the processing tank 12, exhausting gas from the interior of the processing tank 12, and supplying an ion gas to the water-containing organic matter.

The processing apparatus 10 shifts the temperature in the processing tank 12 within the range from 25° C. to 70° C. by the heater 72 during the processing of the water-containing organic matter, sets the ion density to preferably 60,000,000 pcs/cc or higher, and performs the processing of the water-containing organic matter in the processing tank 12 preferably continuously for a time period ranging from 2 hours to 70 hours. Thus, the biomass material according to the present embodiment can be manufactured from various water-containing organic matters having different moisture contents and the like.

The biomass material according to the present embodiment thus obtained can maintain its state at the time of manufacture in which the moisture content is 20% or less, the bacterial count of mesophilic aerobic bacteria is $10^5$/g or less, and the temperature at which the maximum exothermic peak is detected with the differential thermal analysis method is 300° C. or higher, even after being left at room temperature for 1 year from the manufacture. Therefore, a biomass material having long-term preservability can be provided, and a molding material that is easy to handle can be attained.

Biomass materials of the related art manufactured for reusing water-containing organic matters have a maximum exothermic peak detected with the differential thermal analysis method at a temperature of lower than 300° C. and have low heat resistance, and therefore are difficult to use for molding, such as injection molding and extrusion molding, that requires heating at a high temperature. However, the biomass material according to the present embodiment can have a maximum exothermic peak detected with the differential thermal analysis method at a temperature of 300° C. or higher, and therefore can be used for molding including heating at a high temperature.

(6)<Other Embodiments>

The present invention is not limited to the embodiment described above and may be modified as needed within a scope of the gist of the present invention, and processing tanks having various sizes may be applied as the processing tank. In the embodiment described above, as an ion gas supply unit, the ion gas supply unit 15 is applied that is provided with the negative ion generator 38A and configured to supply an ion gas having a negative ion density of 2,000,000 pcs/cc or higher, preferably higher than 20,000,000 pcs/cc, and more preferably 60,000,000 pcs/cc or higher to the processing tank 12, but the present invention is not limited thereto. For example, an ion gas supply unit may be applied that is provided with a positive ion generator as an ion gas generator and configured to supply an ion gas having a positive ion density of 2,000,000 pcs/cc or higher, preferably higher than 20,000,000 pcs/cc, and more preferably 60,000,000 pcs/cc or higher to the processing tank 12.

As another ion gas supply unit, an ion gas supply unit may be applied that is provided with an ion generator capable of generating both positive ions and negative ions and is configured to supply an ion gas having a density of ions including positive ions and negative ions of 2,000,000 pcs/cc or higher, preferably higher than 20,000,000 pcs/cc, and more preferably 60,000,000 pcs/cc or higher to the processing tank 12.

In the embodiment described above, a case is described in which a blower is provided as the exhaust unit 61 to forcedly exhaust gas from the interior of the processing tank 12, but the present invention is not limited thereto. For example, such a configuration is also applicable in which a blower that serves as a suction unit is provided in the negative ion generator 38A on the suction side, a simple filter is employed as the exhaust unit, and gas in the processing tank 12 is exhausted from the exhaust unit by suction with the suction unit at a rate ranging from 1 $m^3$/min to 300 $m^3$/min.

(7)<Verification Test>

(7-1)<Moisture Content and Bacterial Count of Mesophilic Aerobic Bacteria of Biomass Material According to Present Embodiment>

Next, as water-containing organic matters, apple lees, peach lees, carrot lees, green pepper lees, liquor lees, used green tea leaves, barley tea residues, and coffee grounds after beverage extraction were prepared. From each water-containing organic matter, a biomass material was manufactured in accordance with the manufacturing method described above, and the moisture content and the bacterial count of mesophilic aerobic bacteria of each biomass material were examined.

In this case, gas was exhausted from the processing tank 12 at 50 $m^3$/min, the ion density of an ion gas to be supplied to the processing tank 12 was maintained at about 60,000,000 pcs/cc, and the temperature in the processing tank 12 during processing of the water-containing organic matter was shifted within a temperature range from 20° C. to 70° C. Such processing was continuously performed for a predetermined time.

Specifically, 200 kg of apple lees having a moisture content of 78.9% after beverage extraction were prepared and continuously processed for 42 hours using the processing apparatus 10 under the above-described processing conditions with an ion density of about 60,000,000 pcs/cc. The moisture content and the weight of the obtained biomass material were examined. As a result, it was confirmed that the moisture content was 3.2% and the weight was 45 kg. The obtained biomass material was confirmed to have a weight reduced to about one-fifth of the weight before processing.

In addition, 40 kg of peach lees having a moisture content of 71.0% after beverage extraction were prepared and continuously processed for 18 hours using the processing apparatus 10 under the above-described processing conditions with an ion density of about 60,000,000 pcs/cc. The moisture content and the weight of the obtained biomass material were examined. As a result, it was confirmed that the moisture content was 6.2% and the weight was 12 kg. The obtained biomass material was confirmed to have a weight reduced to about one-fourth of the weight before processing.

In addition, 231 kg of carrot lees having a moisture content of 87.1% after beverage extraction were prepared and continuously processed for 48 hours using the processing apparatus 10 under the above-described processing conditions with an ion density of about 60,000,000 pcs/cc. The moisture content and the weight of the obtained biomass material were examined. As a result, it was confirmed that the moisture content was 2.8% and the weight was 24 kg. The obtained biomass material was confirmed to have a weight reduced to about one-tenth of the weight before processing.

In addition, 200 kg of green pepper lees having a moisture content of 84.4% after beverage extraction were prepared and continuously processed for 48 hours using the processing apparatus 10 under the above-described processing conditions with an ion density of about 60,000,000 pcs/cc. The moisture content and the weight of the obtained biomass material were examined. As a result, it was confirmed that the moisture content was 12.1% and the weight was 68 kg. The obtained biomass material was confirmed to have a weight reduced to about one-third of the weight before processing.

In addition, 189 kg of liquor lees (containing wheat bran) having a moisture content of 45.0% after beverage extraction were prepared and continuously processed for 48 hours using the processing apparatus 10 under the above-described processing conditions with an ion density of about 60,000,000 pcs/cc. The moisture content and the weight of the obtained biomass material were examined. As a result, it was confirmed that the moisture content was 3.5% and the weight was 96 kg. The obtained biomass material was confirmed to have a weight reduced to about half of the weight before processing.

In addition, 106 kg of used green tea leaves having a moisture content of 86.4% after beverage extraction were prepared and continuously processed for 24 hours using the processing apparatus 10 under the above-described processing conditions with an ion density of about 60,000,000 pcs/cc. The moisture content and the weight of the obtained biomass material were examined. As a result, it was confirmed that the moisture content was 2.3% and the weight was 17 kg. The obtained biomass material was confirmed to have a weight reduced to about one-sixth of the weight before processing.

In addition, 130 kg of barley tea residue having a moisture content of 80.2% after beverage extraction was prepared and continuously processed for 18 hours using the processing apparatus 10 under the above-described processing conditions with an ion density of about 60,000,000 pcs/cc. The moisture content and the weight of the obtained biomass material were examined. As a result, it was confirmed that the moisture content was 20% or less and the weight was 69 kg. The obtained biomass material was confirmed to have a weight reduced to about half of the weight before processing.

In addition, 303 kg of coffee grounds having a moisture content of 47.0% after beverage extraction were prepared and continuously processed for 68 hours using the processing apparatus 10 under the above-described processing conditions with an ion density of about 60,000,000 pcs/cc. The moisture content and the weight of the obtained biomass material were examined. As a result, it was confirmed that the moisture content was 19.8% or less and the weight was 109 kg. The obtained biomass material was confirmed to have a weight reduced to about one-third of the weight before processing.

(7-2)<Verification Test on Re-Absorption of Moisture in Long-Term Preservation of Biomass Material According to Present Embodiment>

Next, strained lees of apple juice (apple lees) remaining when apple juice was manufactured were processed using the processing apparatus 10 of the present embodiment to manufacture a biomass material. Grounds of coffee (coffee grounds) were also processed using the processing apparatus 10 of the present embodiment to manufacture a biomass material.

In this case, gas was exhausted from the processing tank 12 at 50 $m^3$/min, the ion density of an ion gas to be supplied to the processing tank 12 was maintained at 60,000,000 pcs/cc or higher, and the temperature in the processing tank 12 during processing of the water-containing organic matter was shifted within a temperature range from 20° C. to 70° C. Such processing was continuously performed for approximately 20 hours to manufacture biomass materials from apple lees and coffee grounds, respectively. The apple lees and the coffee grounds used in this verification test were different from the apple lees and the coffee grounds in the examples described for the above-described verification test.

The biomass material manufactured by processing apple lees using the processing apparatus 10 (hereinafter referred to as apple lees biomass material) and the biomass material manufactured by processing coffee grounds using the processing apparatus 10 (hereinafter, referred to as coffee grounds biomass material) were observed focusing on re-absorption of moisture in long-term preservation without specific measure such as tight seal.

Note that the biomass materials according to the present embodiment obtained by processing coffee grounds and apple lees were already left outdoors before this verification test at room temperature (20° C.±15° C. (5 to 35° C.) for about 1 year after manufacture, and confirmed to have a moisture content of 20% or less, a bacterial count of mesophilic aerobic bacteria of $10^5$/g or less, and a maximum exothermic peak detected at 300° C. or higher with the differential thermal analysis method, even after about 1 year from the manufacture. However, verification tests were not performed focusing on re-absorption of moisture at this time, and therefore this verification test was additionally performed.

In this verification test, flexible container bags (manufactured by Atsuta Shizai Co., Ltd., product name: AS-002F (one-way container bag)) with a capacity of 1,000 kg were prepared, which were formed from a sheet woven with strong chemical fibers such as polyethylene and polypropylene.

On Jun. 20, 2019, at a factory in Hirosaki City, Aomori Prefecture, Japan, the above-described apple lees biomass material was made, the apple lees biomass material was put into the flexible container bags, and each of the flexible container bags was filled entirely with the apple lees biomass material. Then, openings of the flexible container bags filled with the apple lees biomass material were tied and sealed.

The flexible container bags filled with the apple lees biomass material were simply laid out in a warehouse on the premises of the above-described factory (Hirosaki City, Aomori Prefecture, Japan) without stacking and left untouched. The warehouse where the flexible container bags were left had side walls made of concrete blocks and a roof made of tin, was not equipped with any particular insulation, and was protected against rain and wind.

The coffee grounds biomass material was packed into flexible container bags in the same manner, and their openings were tied and sealed. The flexible container bags were left in the same warehouse where the flexible container bags filled with the apple lees biomass material were left in the same manner.

The moisture contents of the apple lees biomass material and the coffee grounds biomass material were measured when they were packed in the flexible container bags to start the verification test. The moisture contents in this verification test are values measured with the above-described loss on drying method.

The verification test on the apple lees biomass material was started on Jun. 20, 2019, and the moisture content at the start of the verification test was 11.8%. Then, the flexible container bags filled with the apple lees biomass material were continued to be left at room temperature in the warehouse in Hirosaki City, Aomori Prefecture, Japan as described above, and the moisture content was measured again for the apple lees biomass material in the flexible container bags on Jan. 7, 2020.

As the timing of the verification test, a period (June 2019 to July 2020) was selected when the system was exposed to environments in summer (30° C.) and winter (−10° C.) in order to check the effects of seasonal changes and temperature fluctuations and so on.

The moisture content of the apple lees biomass material in the flexible container bags left in the warehouse from Jun. 20, 2019, to Jan. 7, 2020 was 12.2%. The bacteria count check and the like were conducted on the apple lees biomass material during the verification test, and thus the flexible container bags were opened approximately every month. From the results of the verification test described above, it has been confirmed that the apple lees biomass material manufactured by the processing apparatus 10 of the present embodiment can have a moisture content of 20% or less at the time of manufacture, and can maintain the moisture content at a level at the time of manufacture of 20% or less for a long period of time (about 6 months). It has been confirmed again on June 2020 that the apple lees biomass material can maintain the moisture content at a level at the time of manufacture of 20% or less for a long period of time.

The verification test on the coffee grounds biomass material was started on Jul. 6, 2019, and the moisture content at the start of the verification test was 9.4%. Then, the flexible container bags filled with the coffee grounds biomass material were continued to be left at room temperature in the warehouse in Hirosaki City, Aomori Prefecture, Japan as described above, and the moisture content was measured again also for the coffee grounds biomass material in the flexible container bags on Jan. 7, 2020.

The moisture content of the coffee grounds biomass material in the flexible container bags left in the warehouse from Jul. 6, 2019, to Jan. 7, 2020 was 9.4%. From this result, it has been confirmed that the coffee grounds biomass material having a moisture content set to 20% or less at the time of manufacture can maintain the moisture content at a level at the time of manufacture of 20% or less for a long period of time (about 6 months). It has been confirmed again on June 2020 that the coffee grounds biomass material can maintain the moisture content at a level at the time of manufacture of 20% or less for a long period of time.

It has also been confirmed that the apple lees biomass material and the coffee grounds biomass material have a bacterial count of mesophilic aerobic bacteria of $10^5$/g or less when measured with the standard agar plate culture method. In this verification test, the results of measuring the biomass materials preserved for about 6 months show no rapid change in the transitions of the moisture content and the like, and it has been found again that the biomass materials can be preserved for a period as long as one year.

In a biomass material of the related art manufactured by a food waste processing apparatus of the related art that processes water-containing organic matters such as food waste by crushing and heating, it has been confirmed that the moisture content set to 20% or less immediately after manufacture increases with time and exceeds 20% generally after about 3 to 4 months. It has also been confirmed that as a result, the biomass material of the related art has a bacterial count of mesophilic aerobic bacteria of $10^8$/g or more and starts to decay, and that the long-term preservation of the biomass material of the related art is difficult.

In this verification test, the biomass materials manufactured from apple lees and coffee grounds respectively were preserved for a long period of time to perform a verification test on re-absorption of moisture. From the verification results of the biomass materials obtained from apple lees and coffee grounds, it can be inferred that in addition to the above-described lees, peach lees, carrot lees, green pepper lees, liquor lees, used green tea leaves, and barley tea residues can be similarly used to maintain the moisture content of the biomass material at a level at the time of manufacture of 20% or less for a period of time.

That is, the biomass material according to the present embodiment is obtained by processing including heating a water-containing the organic matter in processing tank 12 while the water-containing organic matter is stirred, exhausting a gas from the processing tank 12 at a rate ranging from 1 $m^3$/min to 300 $m^3$/min, and supplying an ion gas having an ion density of 2,000,000 pcs/cc or higher to the processing tank 12 at a rate ranging from 1 $m^3$/min to 300 $m^3$/min to separate water molecules in the water-containing organic matter and evaporate water contained in the water-containing organic matter, and it can be said that as a result of such processing, the biomass material can maintain the moisture content at 20% or less for a long time with many cell walls undestroyed in the biomass material unlike biomass materials of the related art.

Therefore, as a result of the above-described processing, the resulting biomass materials manufactured from peach lees, carrot lees, green pepper lees, liquor lees, used green tea leaves, and barley tea residues respectively also can have a moisture content of 20% or less with many cell walls undestroyed in the biomass materials similarly to the biomass materials manufactured from apple lees and coffee grounds, and therefore it can be inferred that the moisture content can be maintained as it is for a long time.

(7-3)<Verification Test on Thermogravimetric Analysis, Differential Thermogravimetric Analysis, and Differential Thermal Analysis of Biomass Material According to Present Embodiment>

Next, strained lees of apple juice (apple lees) remaining when apple juice was manufactured, strained lees of carrot juice (carrot lees) remaining when carrot juice was manufactured, and grounds of coffee (coffee grounds) were each processed using the processing apparatus 10 to manufacture biomass materials.

The processing conditions were the same as those in the above-described verification test as follows. Gas was exhausted from the processing tank 12 at 50 $m^3$/min, the ion density of an ion gas to be supplied to the processing tank 12 was maintained at 60,000,000 pcs/cc or higher, and the temperature in the processing tank 12 during processing of the water-containing organic matter was shifted within a temperature range from 20° C. to 70° C. Such processing was continuously performed for approximately 20 hours. Thus, biomass materials were manufactured from the apple lees, the carrot lees, and the coffee grounds, respectively. The apple lees, the carrot lees, and the coffee grounds used in this verification test were different from the apple lees, the carrot lees, and the coffee grounds described for the above-described verification test.

Each of the obtained biomass materials was subjected to thermogravimetric analysis in which the biomass material was heated to examine its weight loss, differential thermogravimetric analysis in which the result of the thermogravimetry was differentiated, and differential thermal analysis in which the endotherm or exotherm of the biomass material during heating was examined.

In the thermogravimetric analysis, the differential thermogravimetric analysis, and the differential thermal analysis, the biomass material was measured using a simultaneous thermogravimetric/differential thermal analyzer (product name "TG/DTA7220") manufactured by SII NanoTechnology Inc.

In this case, the biomass material as a sample and alumina as a reference substance were placed in a simultaneous thermogravimetric/differential thermal analyzer, and the sample (biomass material) and the reference substance (alumina) were heated in the atmosphere from 30° C. to 500° C. The sample at this time was measured with the simultaneous thermogravimetric/differential thermal analyzer to obtain a thermo gravimetry (TG) curve, a differential thermo-gravimetry (DTG) curve, and a differential thermal analysis (DTA) curve of the sample.

Figure 3:
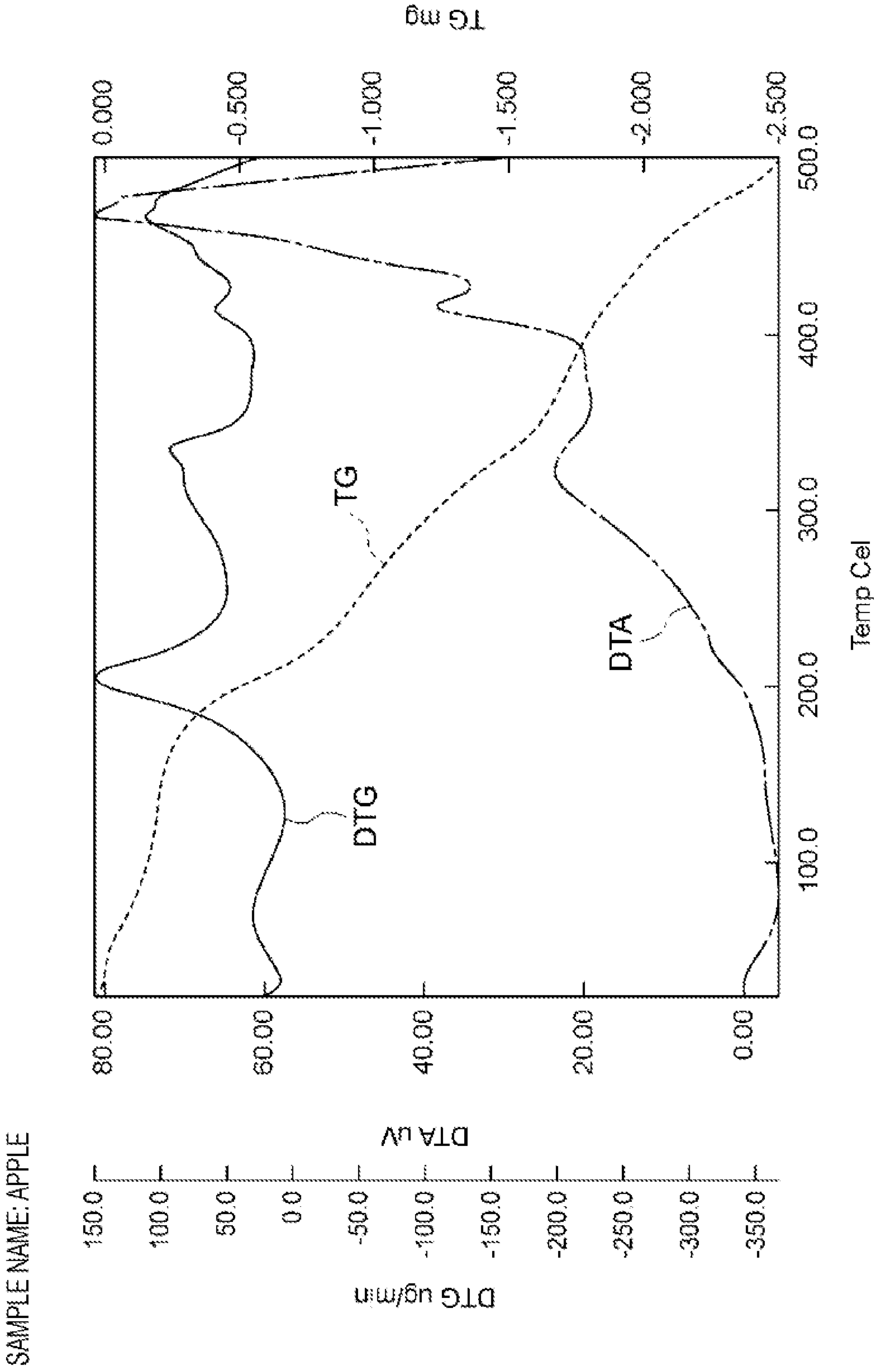
FIG. 3 A graph showing measurement results of thermogravimetric analysis, differential thermogravimetric analysis, and differential thermal analysis of a biomass material obtained from apple lees.

As a result of measuring the biomass material manufactured from the apple lees, the results shown in FIG. 3 (denoted by "SAMPLE NAME: APPLE") were obtained. FIG. 3 shows the measurement results of the thermogravimetric analysis, the differential thermogravimetric analysis, and the differential thermal analysis of the biomass material manufactured from the apple lees.

In FIG. 3, the TG curve, which is the measurement result of the thermogravimetric analysis, shows the temperature [° C.] indicated by the horizontal axis and the weight (mass) change [mg] indicated by the vertical axis. The DTG curve, which is the measurement result of the differential thermogravimetric analysis, shows the temperature [ ° C.] indicated by the horizontal axis and the weight (mass) change rate [μg/min] indicated by the vertical axis. The DTA curve, which is the measurement result of the differential thermal analysis, shows the temperature [ ° C.] indicated by the horizontal axis and the output [uV] of the electromotive force of the thermocouple as a heat flow indicated by the vertical axis.

From the TG curve in FIG. 3, weight loss (a weight loss of approximately 0.25 mg (approximately 10%)) mainly due to the water contained in the sample occurred from the test start temperature, 30° C., to 200° C. Then, weight loss further occurred in the vicinity of 350° C., and the sample burned toward 500° C.

The DTG curve in FIG. 3 has a peak within a temperature range from 70° C. to 80° C., and in addition, has peaks in the vicinity of 220° C. and in the vicinity of 350° C. These peaks are considered to be associated with the weight loss.

The DTA curve in FIG. 3 has been confirmed to have an endothermic peak due to heat of vaporization accompanying volatilization of water up to 100° C. The DTA curve also has an exothermic peak in the vicinity of 310° C. It is inferred that this peak shows exotherm accompanying generation of a pyrolysis gas due to heating. The steep peak from in the vicinity of 430° C. is considered to be due to burning of the sample that is to carbonize. It can be inferred that the maximum exothermic peak appears and the sample carbonizes in the vicinity of about 500° C.

From the above, it has been confirmed that the biomass material manufactured from the apple lees has a maximum exothermic peak detected with the differential thermal analysis method at at least 400° C. or higher, and has high heat resistance.

Figure 4:
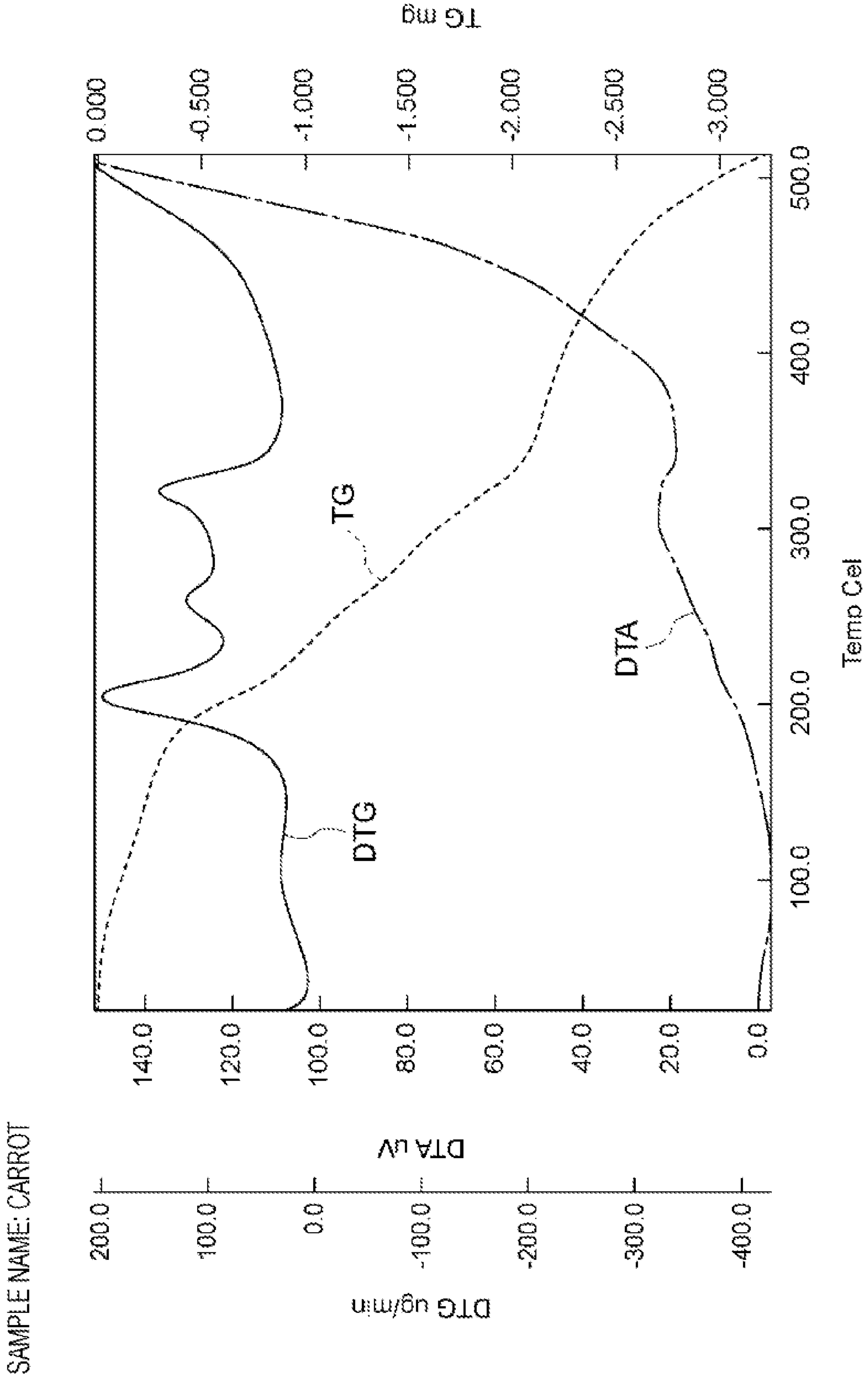
FIG. 4 A graph showing measurement results of thermogravimetric analysis, differential thermogravimetric analysis, and differential thermal analysis of a biomass material obtained from carrot lees.

As a result of measuring the biomass material manufactured from the carrot lees, the results shown in FIG. 4 (denoted by "SAMPLE NAME: CARROT") were obtained. FIG. 4 shows the measurement results of the thermogravimetric analysis, the differential thermogravimetric analysis, and the differential thermal analysis (the TG curve, the DTG curve, and the DTA curve) of the biomass material manufactured from the carrot lees.

From the TG curve in FIG. 4, weight loss (a weight loss of approximately 0.3 mg (approximately 10%)) mainly due to the water contained in the sample occurred from the test start temperature, 30° C., to 200° C. Then, weight loss further occurred in the vicinity of 320° C., and the sample burned toward 500° C.

The DTG curve in FIG. 4 has peaks in the vicinity of 220° C., in the vicinity of 250° C., and in the vicinity of 320° C. These peaks are considered to be associated with the weight loss.

The DTA curve in FIG. 4 has been confirmed to have an endothermic peak due to heat of vaporization accompanying volatilization of water up to 200° C. The DTA curve also has an exothermic peak in the vicinity of 310° C. It is inferred that this peak shows exotherm accompanying generation of a pyrolysis gas due to heating. The steep peak rising toward 500° C. is considered to be due to burning of the sample that is to carbonize. It can be inferred that the maximum exothermic peak appears and the sample carbonizes in the vicinity of about 500° C.

From the above, it has been confirmed that the biomass material manufactured from the carrot lees has a maximum exothermic peak detected with the differential thermal analysis method at at least 400° C. or higher, and has high heat resistance.

Figure 5:
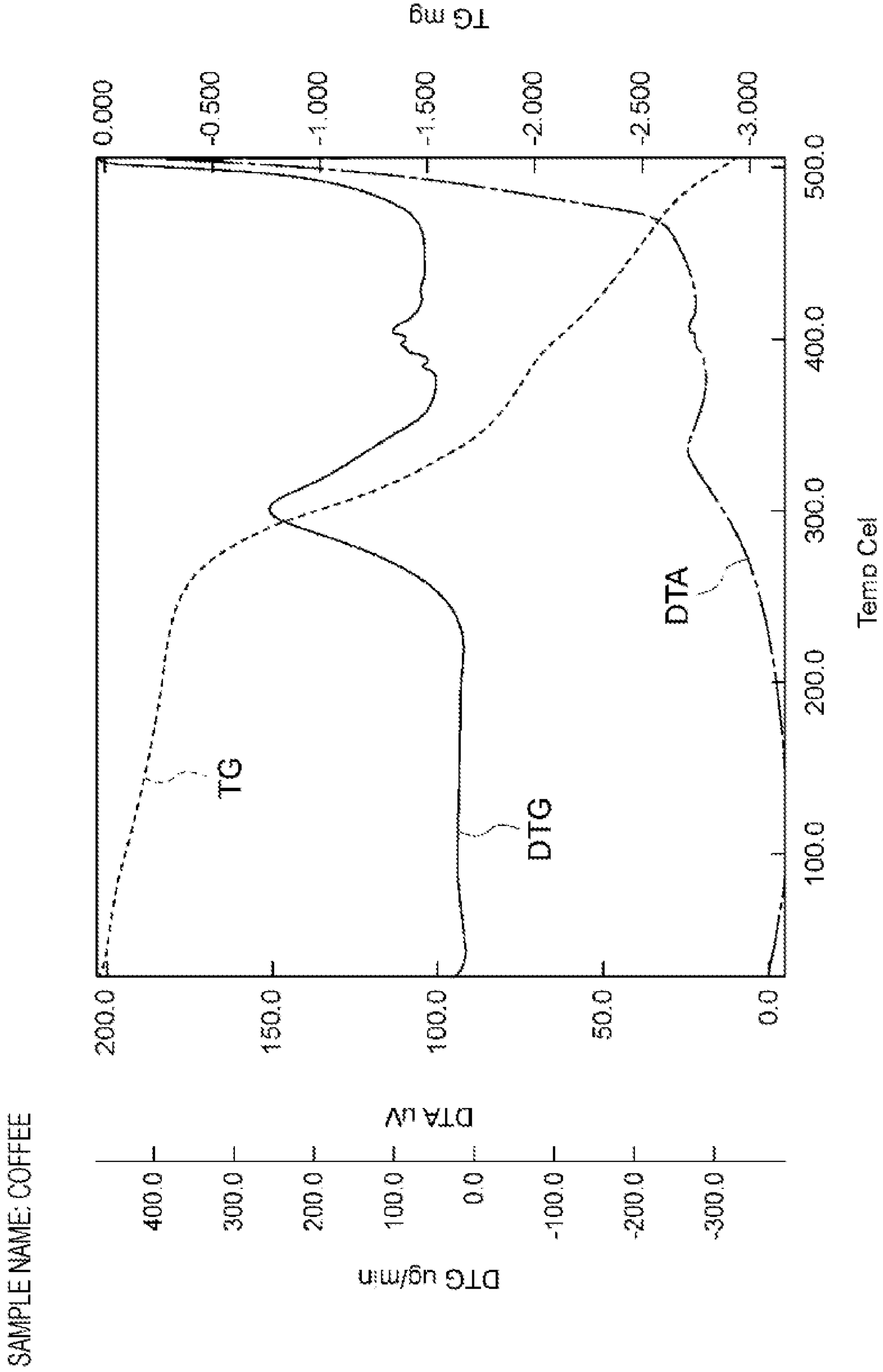
FIG. 5 A graph showing measurement results of thermogravimetric analysis, differential thermogravimetric analysis, and differential thermal analysis of a biomass material obtained from coffee grounds.

As a result of measuring the biomass material manufactured from the coffee grounds, the results shown in FIG. 5 (denoted by "SAMPLE NAME: COFFEE") were obtained. FIG. 5 shows the measurement results of the thermogravimetric analysis, the differential thermogravimetric analysis, and the differential thermal analysis (the TG curve, the DTG curve, and the DTA curve) of the biomass material manufactured from the coffee grounds.

From the TG curve in FIG. 5, weight loss (a weight loss of approximately 0.3 mg (approximately 10%)) mainly due to the water contained in the sample occurred from the test start temperature, 30° C., to 250° C. Then, weight loss further occurred in the vicinity of 350° C., and the sample burned toward 500° C.

The DTG curve in FIG. 5 has peaks in the vicinity of 300° C. and in the vicinity of 400° C. These peaks are considered to be associated with the weight loss.

The DTA curve in FIG. 5 has been confirmed to have an endothermic peak due to heat of vaporization accompanying volatilization of water up to 200° C. The DTA curve also has an exothermic peak in the vicinity of 340° C. It is inferred that this peak shows exotherm accompanying generation of a pyrolysis gas due to heating. The steep peak rising toward 500° C. is considered to be due to burning of the sample that is to carbonize. It can be inferred that the maximum exothermic peak appears and the sample carbonizes in the vicinity of about 510° C.

From the above, it has been confirmed that the biomass material manufactured from the coffee grounds has a maximum exothermic peak detected with the differential thermal analysis method at at least 400° C. or higher, and has high heat resistance.

Thus, it has been confirmed that the biomass materials manufactured from the apple lees, the carrot lees, and the coffee grounds respectively by processing with the processing apparatus 10 each have a maximum exothermic peak detected with the differential thermal analysis method at 400° C. or higher, that is, at a higher temperature than the maximum exothermic peak of biomass materials of the related art, and therefore can be heated during molding at a higher temperature than biomass materials of the related art.

(7-4)<Physical Properties of Molded Product Manufactured Using Molding Material According to Present Embodiment>

Next, the physical properties of a molded article manufactured using the molding material according to the present embodiment were confirmed. Here, grounds of coffee (coffee grounds) were processed using the processing apparatus 10 of the present embodiment to manufacture a biomass material. Then, foreign materials were removed from the biomass material by a vibration screen. The obtained biomass material and a polypropylene resin (PP) were mixed with a mixer to manufacture a molding material.

Here, two kinds of molding materials were manufactured as examples. One of these is a molding material including 30 mass % of the biomass material obtained by processing the coffee grounds and 70 mass % of the polypropylene resin (PP) (molding material to be a molded article as an example 1). The other is a molding material including 50 mass % of the biomass material obtained by processing the coffee grounds and 50 mass % of the polypropylene resin (PP) (molding material to be a molded article as an example 2).

The processing conditions at the time of manufacturing the biomass material were the same as those in the above-described verification test as follows. Gas was exhausted from the processing tank 12 at 50 $m^3$/min, the ion density of an ion gas to be supplied to the processing tank 12 was maintained at 60,000,000 pcs/cc or higher, and the temperature in the processing tank 12 during processing of the water-containing organic matter was shifted within a temperature range from 20° C. to 70° C. Such processing was continuously performed for approximately 20 hours.

Subsequently, the two kinds of molding materials were each subjected to injection molding using a commercially available injection molding machine to manufacture cylindrical molded articles (examples 1 and 2).

In addition, as a comparative example, a cylindrical molded article including 100 mass % of the polypropylene resin (PP) (general-purpose PP) was manufactured by injection molding under the same conditions as those for the examples 1 and 2.

The examples 1 and 2 and the comparative example were measured using a specific gravity measuring device, and determined to have a specific gravity of 1.025, 1.101, and 0.91, respectively.

The examples 1 and 2 and the comparative example were each measured using a tension measuring device to examine the tensile stress in accordance with JIS K 7113, and determined to have a tensile stress of 26 Mpa, 35 Mpa, and 35 Mpa, respectively.

The examples 1 and 2 and the comparative example were each measured using a flexural modulus measuring device and a flexural strength measuring device to examine the flexural modulus and the flexural strength in accordance with JIS K 7171. As a result, the example 1 had a flexural modulus of 2.000 MPa, the example 2 had a flexural modulus of 3.570 MPa, and the comparative example had a flexural modulus of 1.350 MPa. The example 1 had a flexural strength of 46 MPa, the example 2 had a flexural strength of 55 MPa, and the comparative example had a flexural strength of 41 MPa.

The examples 1 and 2 and the comparative example were each measured using an impact strength measuring device to examine the Charpy impact strength in accordance with JIS K 7111, and determined to have a Charpy impact strength of 2.9 kJ/$m^2$, 3.3 kJ/$m^2$, and 3.3 kJ/$m^2$, respectively.

The examples 1 and 2 and the comparative example were each heated to examine the heat distortion temperature at which the outer shape deformed, and determined to have a heat distortion temperature of 115° C., 130° C., and 100° C., respectively.

From the above, it has been confirmed that the examples 1 and 2 including the molding material according to the present embodiment have an improved flexural modulus, flexural strength, and heat distortion temperature as compared with the general-purpose PP product. Furthermore, a molded article was produced with an injection molding machine using a molding material including 10 mass % of the biomass material obtained by processing the coffee grounds and 90 mass % of the polypropylene resin (PP), and this molded article was also measured to determine the flexural modulus, the flexural strength, and the heat distortion temperature. As a result, it has been confirmed that this molded article has an improved flexural modulus, flexural strength, and heat distortion temperature as compared with the general-purpose PP product.

REFERENCE SIGNS LIST

10: Processing apparatus
12: Processing tank
14: Stirring unit
15: Ion gas supply unit
38A: Negative ion generator (ion generator)
61: Exhaust unit
72: Heater

The invention claimed is:

1. A molding material for a material of a molded article, the molding material comprising:
- a biomass material obtained from a water-containing organic matter; and
- a thermoplastic resin or a thermosetting resin,
- the biomass material having:
  - a moisture content of 20% or less,
  - a bacterial count of mesophilic aerobic bacteria of $10^5$/g or less, and
  - a maximum exothermic peak in a differential thermal analysis (DTA) curve by a differential thermal analysis method of 350° C. or higher.

2. The molding material according to claim 1, wherein the biomass material has the maximum exothermic peak in the DTA curve by the differential thermal analysis method of 350° C. or higher and 700° C. or lower.

3. The molding material according to claim 1, wherein the water-containing organic matter is any one of vegetable waste, fruit waste, cut grass, an organic residue after beverage extraction, meat waste, fish waste, sewage, and waste foods.

4. The molding material according to claim 3, wherein the organic residue after beverage extraction is any one of apple lees, tangerine lees, grape lees, grapefruit lees, peach lees, carrot lees, green pepper lees, liquor lees, used green tea leaves, a barley tea residue, and coffee grounds.

5. The molding material according to claim 1, having a pellet form.

6. A molded article manufactured by molding the molding material according to claim 1.

7. A method for manufacturing the molding material according to claim 1, the method comprising:
- a storing step of storing a water-containing organic matter in a processing tank;
- a processing step of heating the water-containing organic matter in the processing tank while the water-containing organic matter is stirred, supplying an ion gas having an ion density of 2,000,000 pcs/cc or higher to the processing tank at a rate ranging from 1 $m^3$/min to 300 $m^3$/min by exhausting a gas from the processing tank at a rate ranging from 1 $m^3$/min to 300 $m^3$/min to separate water molecules in the water-containing organic matter and evaporate water contained in the water-containing organic matter, for manufacture of a biomass material; and
- a manufacturing step of mixing a thermoplastic resin or a thermosetting resin with the biomass material to manufacture a molding material.

8. The method for manufacturing the molding material according to claim 7, wherein
- a temperature in the processing tank is shifted within a range from 25° C. to 70° C. during the processing step, and
- the processing step is continuously performed for 2 hours or more and 70 hours or less.

9. The method for manufacturing the molding material according to claim 7, wherein the ion gas having the ion density is formed by a negative ion generator comprising one or more of corona discharge or thermal ionization.

10. The method for manufacturing the molding material according to claim 7, further comprising generating the ion gas having the ion density with a negative ion generator comprising one or more of corona discharge or thermal ionization.

11. The method for manufacturing the molding material according to claim 7, wherein the water-containing organic matter is an organic residue after beverage extraction comprising apple lees, tangerine lees, grape lees, grapefruit lees, peach lees, carrot lees, green pepper lees, liquor lees, a barley tea residue, or combinations thereof.

12. A molding material for a material of a molded article, the molding material comprising:
- a biomass material obtained from a water-containing organic matter; and
- a thermoplastic resin or a thermosetting resin,
- the biomass material having:
  - a moisture content of 20% or less, and
  - a maximum exothermic peak in a differential thermal analysis (DTA) curve by a differential thermal analysis method of 350° C. or higher,
- wherein the water-containing organic matter is an organic residue after beverage extraction comprising apple lees, tangerine lees, grape lees, grapefruit lees, peach lees, carrot lees, green pepper lees, liquor lees, used green tea leaves, a barley tea residue, coffee grounds, or combinations thereof.

13. The molding material of claim 12, wherein the organic residue after beverage extraction comprises apple lees, tangerine lees, grape lees, grapefruit lees, peach lees, carrot lees, green pepper lees, or combinations thereof.

14. The molding material of claim 12, wherein the biomass material has the maximum exothermic peak in the DTA curve by the differential thermal analysis method of 350° C. or higher and 700° C. or lower.

15. The molding material of claim 12, wherein the biomass material has the maximum exothermic peak in the DTA curve by the differential thermal analysis method of 400° C. or higher.

16. The molding material according to claim 12, wherein the maximum exothermic peak by the differential thermal analysis method is 450° C. or higher.

17. The molding material according to claim 12, wherein the maximum exothermic peak by the differential thermal analysis method is 600° C. or lower.

18. The molding material of claim 1, wherein the biomass material has the maximum exothermic peak in the DTA curve by the differential thermal analysis method of 400° C. or higher.

19. The molding material according to claim 1, wherein the maximum exothermic peak by the differential thermal analysis method is 450° C. or higher.

20. The molding material according to claim 1, wherein the maximum exothermic peak by the differential thermal analysis method is 600° C. or lower.

* * * * *